United States Patent [19]

Engdahl

[11] Patent Number: 4,762,590

[45] Date of Patent: Aug. 9, 1988

[54] CAUSTICIZING PROCESS

[75] Inventor: Holger Engdahl, Savonlinna, Finland

[73] Assignee: Enso-Gutzeit Oy, Helsinki, Finland

[21] Appl. No.: 870,244

[22] Filed: Jun. 3, 1986

[51] Int. Cl.[4] .................................................. D21C 11/12
[52] U.S. Cl. .................................. 162/30.11; 162/35; 423/165; 423/183; 423/432; 423/64 D; 423/641; 423/DIG. 3
[58] Field of Search ............... 162/30.11, 35; 423/432, 423/640, 641, DIG. 3, 165, 183

[56] References Cited

U.S. PATENT DOCUMENTS

| | | | |
|---|---|---|---|
| 1,691,511 | 11/1928 | Bates | 423/DIG. 3 |
| 1,743,080 | 1/1930 | Bradley et al. | 423/DIG. 3 |
| 2,552,183 | 5/1951 | Knight | 423/DIG. 3 |
| 2,979,380 | 4/1961 | Miller | 423/641 |
| 3,194,638 | 7/1965 | Neuville | 162/30.11 |
| 3,210,235 | 10/1965 | Ferrigan et al. | 423/DIG. 3 |
| 3,414,468 | 12/1968 | Copeland | 423/DIG. 3 |
| 4,093,508 | 6/1978 | Henricson | 162/30.11 |
| 4,159,922 | 7/1979 | Cosper | 423/DIG. 3 |
| 4,302,281 | 11/1981 | Ryham | 162/30.11 |

FOREIGN PATENT DOCUMENTS

| | | | |
|---|---|---|---|
| 450418 | 8/1948 | Canada | 162/30.11 |
| 26401 | 7/1971 | Japan | 423/165 |
| 00931 | 11/1979 | World Int'Prop O. | |

Primary Examiner—John Doll
Assistant Examiner—Wayne A. Langel
Attorney, Agent, or Firm—Toren, McGeady & Associates

[57] ABSTRACT

The invention concerns a causticizing procedure by which from soda liquor derived from a sulphate cellulose digesting process and from unslaked lime is produced white liquor for reuse in the digesting process, over lime slaking and a subsequent causticizing reaction proper. It is essential in the invention that the lime slaking is carried out using white liquor, whereafter the causticizing reaction proper is allowed to take place between the slaked lime and soda liquor combined therewith. The requisite white liquor is obtained by recirculating part of the white liquor produced by the causticizing process, to the slaking step, where it either completely or partially replaces the soda liquor employed in prior art. By using white liquor, one avoids the foaming, interfering with the process, which is encountered in the slaking step.

7 Claims, 1 Drawing Sheet

CAUSTICIZING PROCESS

The present invention concerns a causticizing process wherein of soda liquor and of unslaked lime is produced white liquor and lime sludge, over lime slaking and a subsequent causticizing reaction proper.

The spent liquor from sulphate cellulose digesting is recovered mainly in the form of soda liquor containing sodium carbonate, or of green liquor, which is causticized with lime to become white liquor containing mainly sodium hydroxide. The white liquor is reused, possibly after intermediate storage, in the cellulose digestion. The other product from the causticizing reaction is lime sludge consisting mainly of sodium carbonate, and this is calcinated in a lime sludge kiln to become unslaked lime that can be reused in the causticizing process.

The first step in the causticizing process is slaking of the lime, taking place by effect of water:

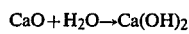
$$CaO + H_2O \rightarrow Ca(OH)_2$$

The reaction is fast, and a considerable quantity of heat is liberated in connection therewith. Next, the causticizing reaction proper takes place, in which the slaked lime reacts with the sodium carbonate contained in soda liquor:

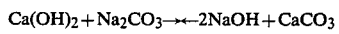
$$Ca(OH)_2 + Na_2CO_3 \rightleftharpoons 2NaOH + CaCO_3$$

The causticizing reaction is slow and it ends at a certain equilibrium between sodium hydroxide and lime sludge, which are the reaction products, and the starting substances. The reaction is endothermic, although the heat quantity which is bound is substantially less than that released in the lime slaking process.

In existing procedures, causticizing is ususally accomplished in that the soda liquor and unslaked lime are combined, whereby the water contained in the soda liquor causes slaking of the lime, whereafter the causticizing reaction proper takes place between the slaked lime and the sodium carbonate in the soda liquor. However, the problem embarrassing this procedure is the tendency of the soda liquor to form foam at the slaking step, the process being disturbed as its consequence. The foam formation is due to solid and/or solved impurities in the soda liquor, such as carbon and organic substances derived from black liquor, which have a surface-active effect.

The object of the present invention is to devise a problem solution by which said known drawback of the causticizing methods of prior art can be avoided. The invention is characterized in that lime slaking is carried out using white liquor, whereupon the causticizing reaction proper is allowed to take place between the slaked lime and the soda liquor combined therewith.

Since white liquor is a substantially pure, and free from surface-active impurities, product mainly consisting of sodium hydroxide, no foaming whatsoever takes place in lime slaking performed with its aid. Since white liquor constitutes one of the two end products of the causticizing process, the required white liquor is simply obtainable by separating part of the white liquor that has been produced and recirculating it to the slaking step. The liquor quantity that is circulated may be 5 to 50%, preferably about 20% of the liquor quantity obtained in the process after lime sludge separation. Thanks to said recirculation of white liquor, it is further possible to achieve a higher degree of causticizing in the process than before.

Instead of recirculated white liquor, it is naturally possible to use in the process other white liquor as well. The white liquor produced by the causticizing process is typically a strong alkali with NaOH its main component, and which may in addition contain small quantities of $Na_2S$, $Na_2CO_3$, $Na_2SO_4$, $Na_2SO_3$ and NaCl. The total alkali of the liquor, which is calculated in grams $Na_2O$ per liter, is within the limits of 70-180 g, most appropriately 110-145 g. Any sodium-based liquor consistent with these values as to its concentration can thus be contemplated, that is, white liquor recirculated in the process or added in the slaking step of the process, or pure NaOH.

The most advantageous design, from the viewpoint of the foaming problem, is that in which lime slaking is accomplished exclusively with white liquor, the whole of the soda liquor quantity to be causticized being combined with the lime only after the slaking step. However, an improvement in comparison with prior art techniques is also achieved if only part of the soda liquor used towards slaking according to prior art technique is replaced with white liquor. It is thus understood that in such an embodiment of the procedure soda liquor is used on the side of white liquor to slake the lime, the soda liquor quantity to be causticized being divided into two parts of which one is conducted to lime slaking and the other is combined with the lime after slaking.

It is also possible in connection with the invention to enhance the utilisation of the thermal energy released at slaking, by carrying out the entire causticizing process, or preferably only its slaking step, in known manner under elevated pressure. If pressure is only applied at the slaking step, the thermal energy released can be utilized by means of the steam which is separated, by conducting this steam to a suitable point of consumption, or it may be recovered by heat transfer to an external fluid.

The invention is decsribed in the following in greater detail with the aid of examples, referring to the attached drawing, wherein.

Figure 1:
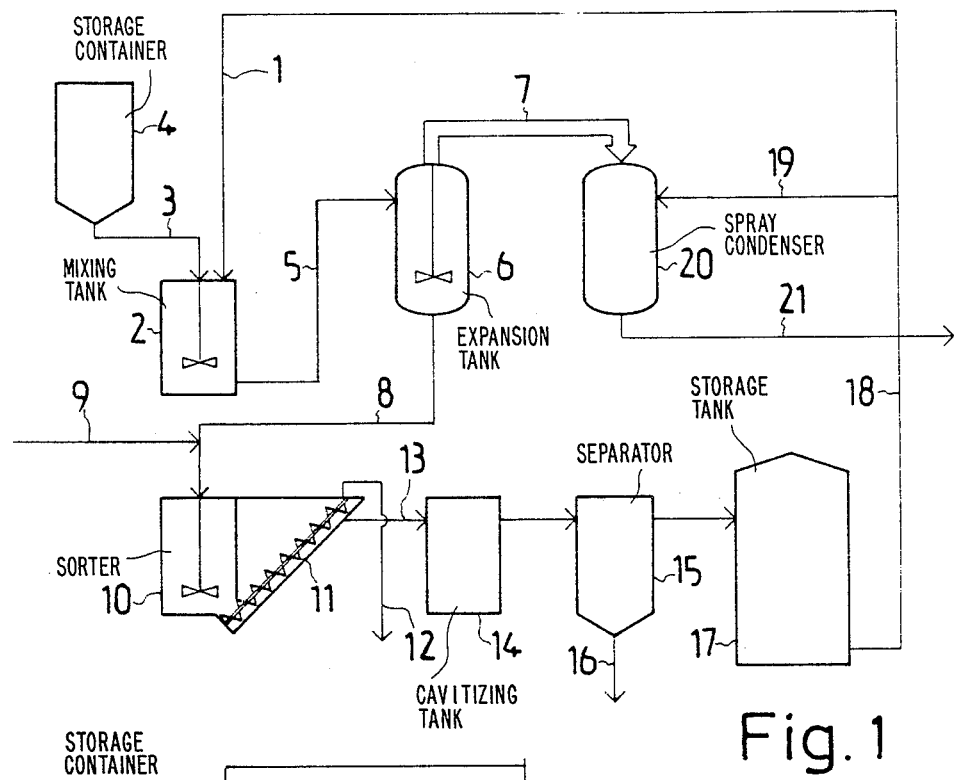
FIG. 1 represents an apparatus intended for applying the invention.

Slaking the unslaked slime for use in causticizing soda, or green, liquor is accomplished in the apparatus depicted in FIG. 1, with white liquor obtained as end product in the causticizing process.

White liquor is circulated by the line 1 to a mixing tank 2, into which further is supplied unslaked lime by the line 3 from the storage container 4. In the mixing tank 2, the unslaked lime and white liquor are rapidly mixed together and they are immediately thereafter pumped through the line 5 into a pressurized expansion tank 6. In the expansion tank 6 the exothermal slaking reaction takes place between the unslaked lime and the water contained in the white liquor, and the pressure in this tank is so controlled that the mixture of lime and white liquor is first heated up to the boiling temperature consistent with the pressure, i.e. to 120° C., and thereafter the rest of the thermal energy set free in the reaction is consumed in vaporizing the water in the mixture. The steam thus obtained, which is at 115° C., goes to the line 7, and the white liquor containing the slaked lime departs from the tank 6 into the line 8.

The next step in the causticizing process is the causticizing reaction proper between the slaked lime and the sodium carbonate contained in the soda, or green, liquor that is being causticized. The green liquor, which is at 95° C., is forwarded into an apparatus as depicted in FIG. 1, through the incoming line 9, which joins the line 8 coming from the expansion tank 6. The green liquor and the white liquor containing the slaked lime become mixed and they go, to begin with, to the sorter 10. The sorter 10 is unpressurized and the temperature of the mixture to be causticized which is introduced therein is 104° C., that is, lower than the boiling point of the mixture. The purpose with the sorter 10 is to separate from the mixture to be causticized any unslaked lime and stone material, these being removed with a conveyor 11 to the line 12. The sorter 10 is by a line 13 connected with the causticizing tank proper, 14, where the causticizing reaction mainly takes place. Upon causticizing, the lime sludge is separated from the white liquor that has been obtained, in the separator 15, and it is removed to the line 16. The white liquor is transferred from the separator 15 to an unpressurized storage tank 17.

Of the white liquor that has been obtained and that is stored in the tank 17, part is returned, as has been described, to the lime slaking step, and the rest is used in the cellulose digesting process. The portion which is returned to the slaking step is 5 to 50%, preferably about 20%, of the liquor quantity stored in the tank. The line 18 starting from the storage tank 17 branches into a recirculation line 1 leading to the white liquor and lime mixing tank 2 and a line 19, which conducts the white liquor going to cellulose digestion into a spray condenser 20 serving as preheater for the white liquor. This heating is accomplished with the hot steam generated in the lime slaking step and carried to the condenser 20 by the line 7, this steam condensing and at the same time heating the white liquor to 110° C., at which temperature it is conducted by the line 21 to the cellulose digester.

Figure 2:
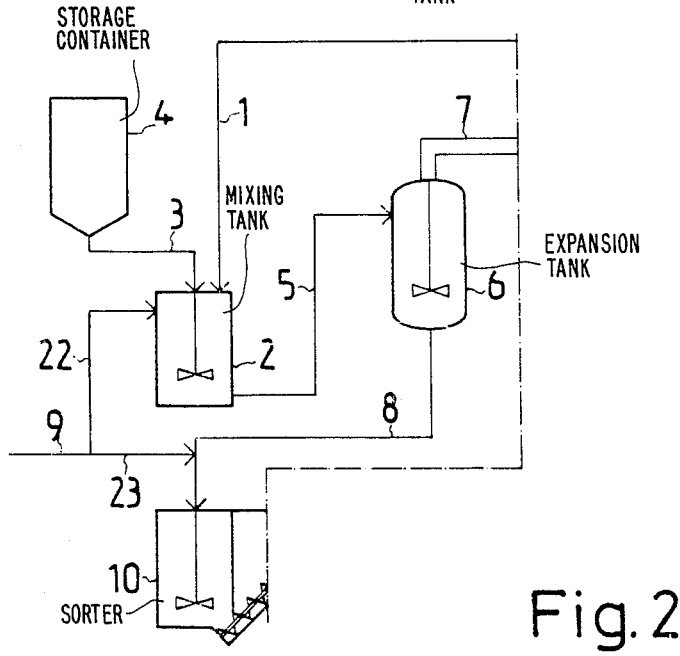
FIG. 2 shows part of another apparatus intended for applying the invention.

In the embodiment of the invention depicted in FIG. 1, white liquor is exclusively used towards lime slaking. FIG. 2 illustrates an alternative design in which green liquor is used in addition to white liquor towards lime slaking. To this end, the green liquor to be causticized is divided into two parts, one part being supplied to the lime slaking step and the other part being combined with the lime after the slaking step. It is thus understood that the incoming green liquor line 9 branches into two lines 22,23, one of them leading to the liquor and unslaked lime mixing tank 2 and the other joining the line 8 transporting slaked lime from the expansion tank 6 to the sorter 10. In other parts, the apparatus of FIG. 2 is equivalent to that of FIG. 1.

In the apparatus of FIG. 2, the green liquor conducted to the lime slaking step may in some instances cause slight foaming, which the invention is meant to prevent. However, the foaming is substantially less than in the case that the lime is slaked, as taught by prior art, with green liquor alone.

It is obvious to a person skilled in the art that different embodiments of the invention are not confined to the examples presented and that they may, rather, vary within the scope of the claims following below.

What is claimed is:

1. A causticizing process for the production of white liquor and lime sludge from soda liquor and unslaked lime, comprising the steps of slaking a quantity of unslaked lime with the use of a slaking medium containing strong white liquor, and combining the mixture of the slaking medium and slaked lime obtained by the slaking step with an amount of soda liquor, so that a causticizing reaction is caused between the soda liquor and the slaked lime yielding white liquor and lime sludge.

2. Process according to claim 1, wherein towards lime slaking is used white liquor produced by the process, of said liquor 5 to 50% being recirculated to the slaking step.

3. Process according to claim 2, wherein about 20% of the white liquor is recirculated to the slaking step.

4. Process according to claim 1, wherein the lime slaking is carried out exclusively with white liquor, the whole quantity of soda liquor to be causticized being combined with the lime after the slaking step.

5. Process according to claim 1, wherein towards lime slaking is on the side of white liquor used soda liquor, the soda liquor quantity to be causticized being devided into two parts, of which one is conducted to the lime slaking step and the other is combined with the lime after the slaking step.

6. Process according to claim 1, wherein over-pressure is used in the slaking step and the thermal energy released in the slaking step is utilized from the steam that is produced.

7. Process according to claim 1, wherein over-pressure is used in the slaking step and the thermal energy released in the slaking step is recovered by means of heat transfer to an external fluid.

* * * * *